United States Patent [19]

Imai et al.

[11] Patent Number: 4,939,657

[45] Date of Patent: Jul. 3, 1990

[54] CONSTANT-SPEED CRUISING CONTROL SYSTEM

[75] Inventors: Takeshi Imai; Kouichirou Waki; Yasuhiro Harada, all of Hiroshima, Japan

[73] Assignee: Mazda Motor Corporation, Hiroshima, Japan

[21] Appl. No.: 263,421

[22] Filed: Oct. 27, 1988

[30] Foreign Application Priority Data

Oct. 28, 1987 [JP] Japan .................. 62-272022

[51] Int. Cl.⁵ .......................................... B60K 31/00
[52] U.S. Cl. .................. 364/426.04; 180/179; 364/424.1
[58] Field of Search .............. 364/426.04, 424.1; 324/161; 180/170, 179; 123/352

[56] References Cited

U.S. PATENT DOCUMENTS

| | | | |
|---|---|---|---|
| 4,451,890 | 5/1984 | Suzuki et al. | 364/426.04 |
| 4,598,370 | 7/1986 | Nakajima et al. | 364/426.04 |
| 4,725,969 | 2/1988 | Onogi et al. | 364/565 |
| 4,771,848 | 9/1988 | Namba et al. | 180/197 |
| 4,829,437 | 5/1989 | Suzuki et al. | 364/426.04 |
| 4,833,612 | 5/1989 | Okuno et al. | 364/426.04 |
| 4,835,696 | 5/1989 | Suzuki et al. | 364/426.04 |

FOREIGN PATENT DOCUMENTS

| | | | |
|---|---|---|---|
| 0284001 | 9/1988 | European Pat. Off. | 180/176 |
| 58-39312 | 8/1983 | Japan . | |

*Primary Examiner*—Thomas G. Black
*Attorney, Agent, or Firm*—Sixbey, Friedman, Leedom & Ferguson

[57] ABSTRACT

In a constant-speed cruising control system for a vehicle in which the throttle opening is feedback-controlled according to the difference between the actual vehicle speed and a desired vehicle speed so that the actual vehicle speed matches the desired vehicle speed, the vehicle speed is constantly detected when it increases in response to a driver's command, and the throttle valve is controlled so that the throttle opening converges on a target throttle opening which is predetermined according to the vehicle speed. The target throttle opening is corrected according to the running condition of the vehicle so that the vehicle speed is increased at a constant acceleration irrespective of the running condition of the vehicle.

12 Claims, 15 Drawing Sheets

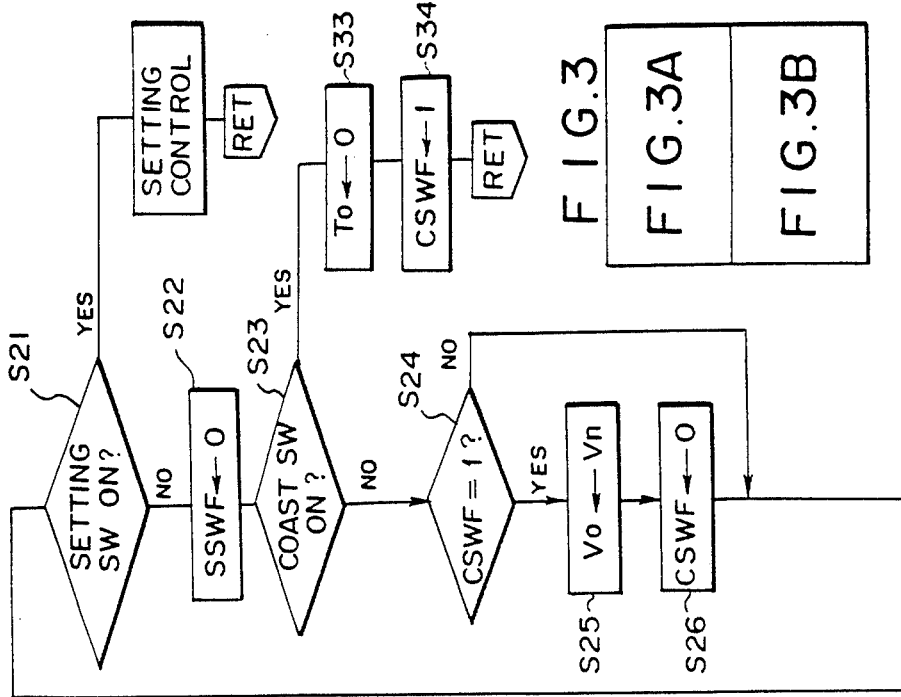
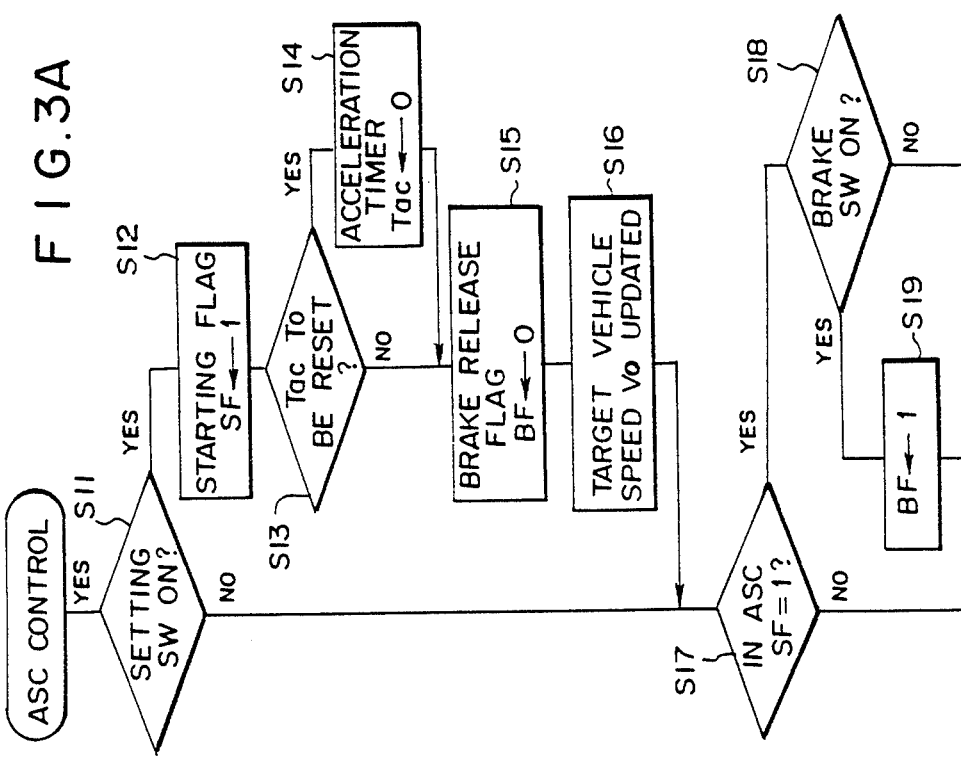
FIG. 3A

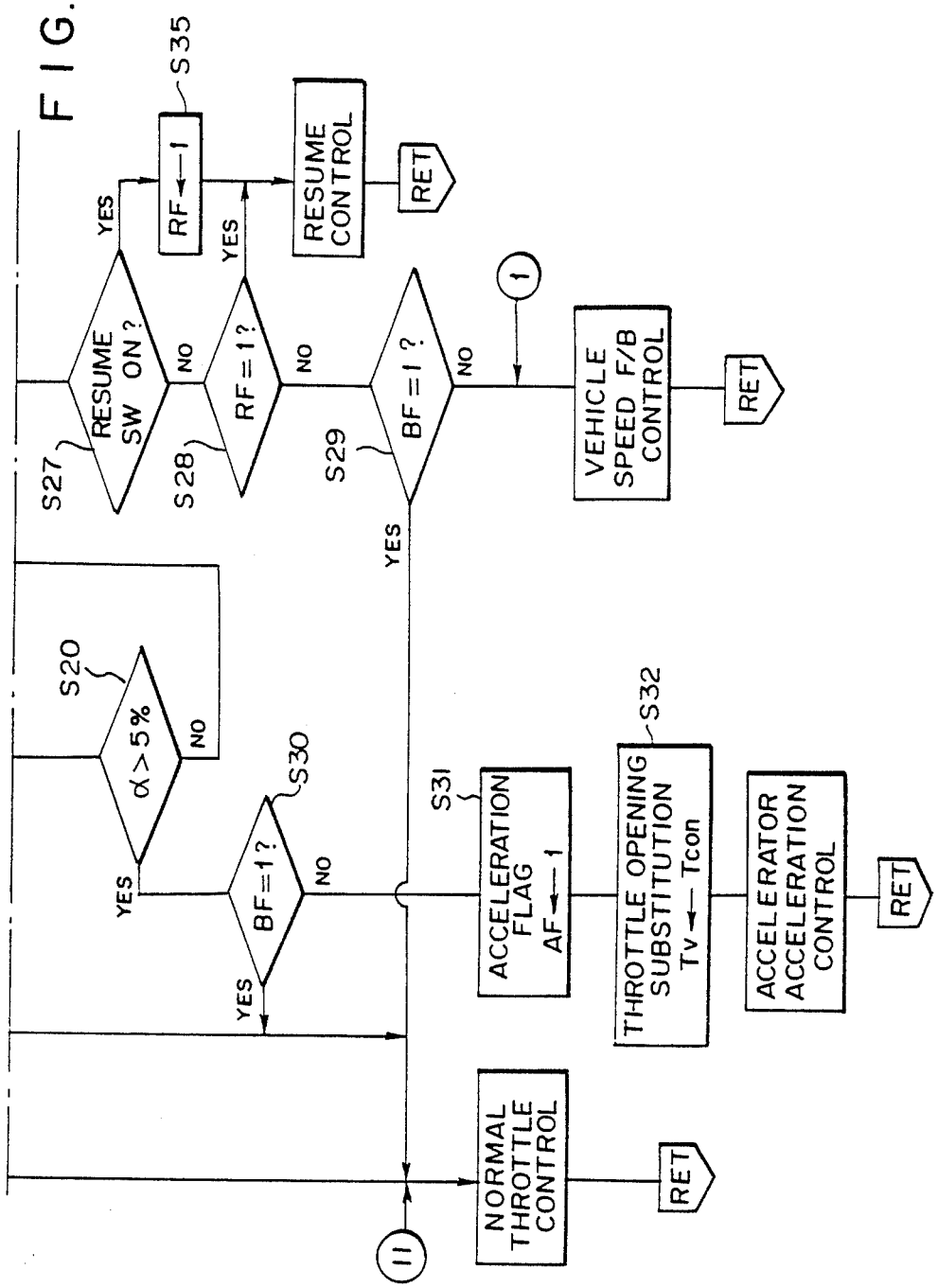

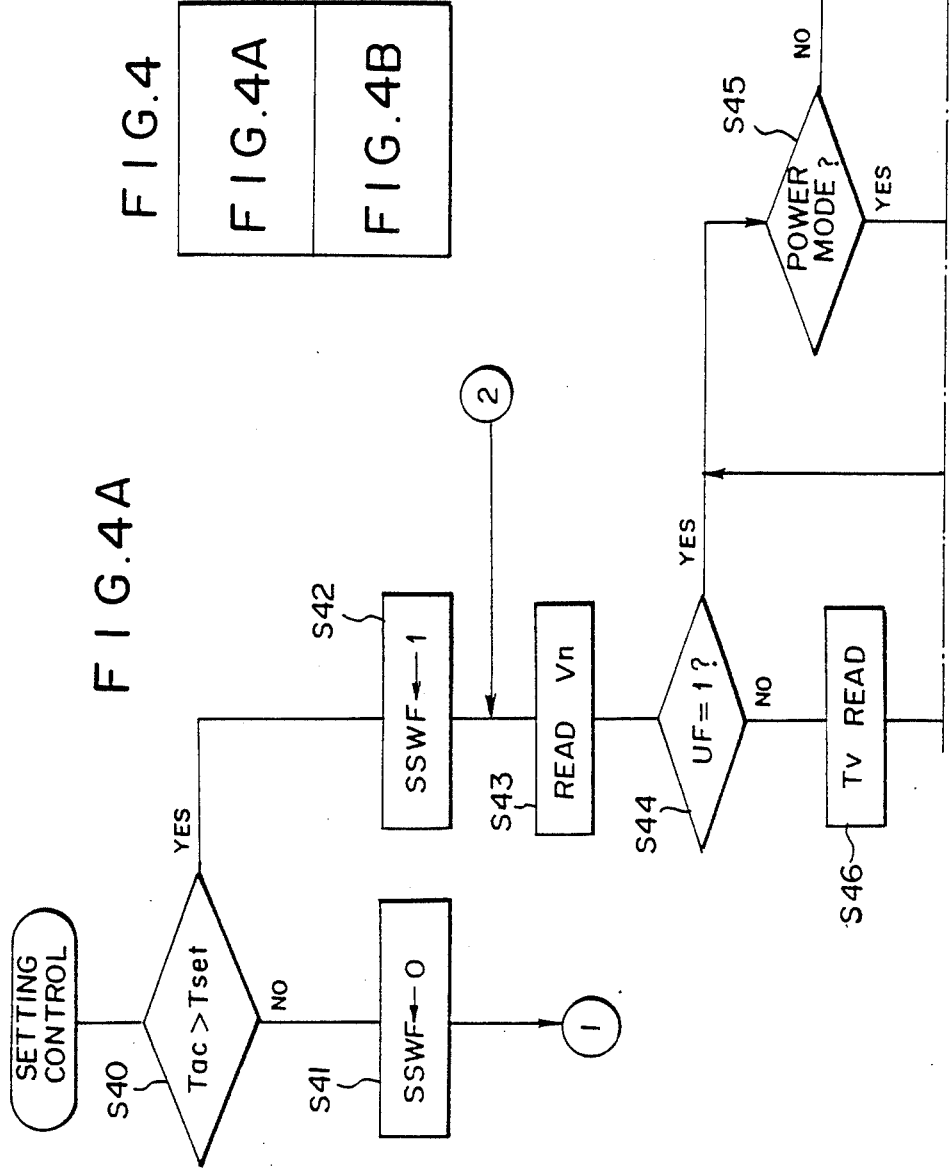

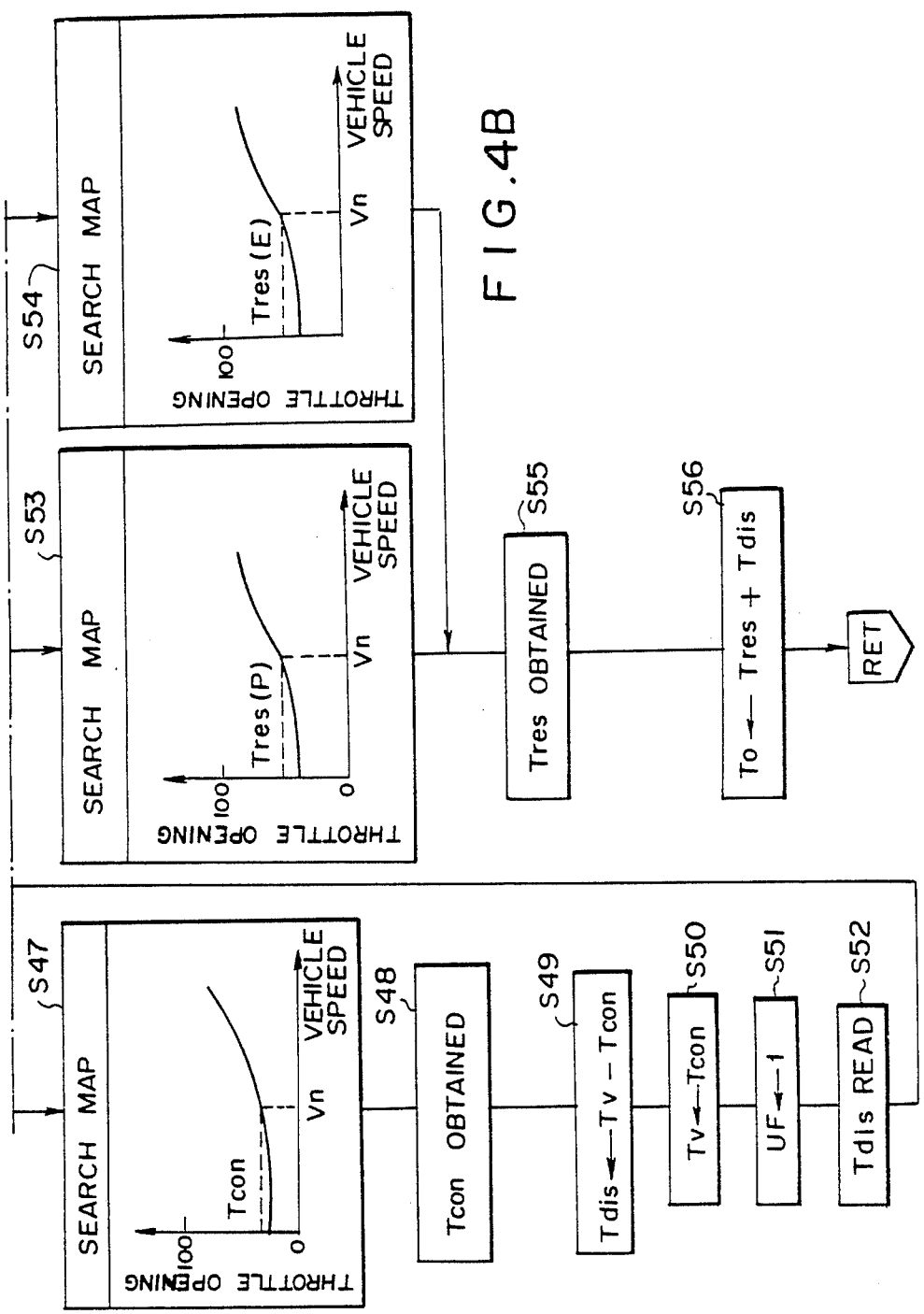

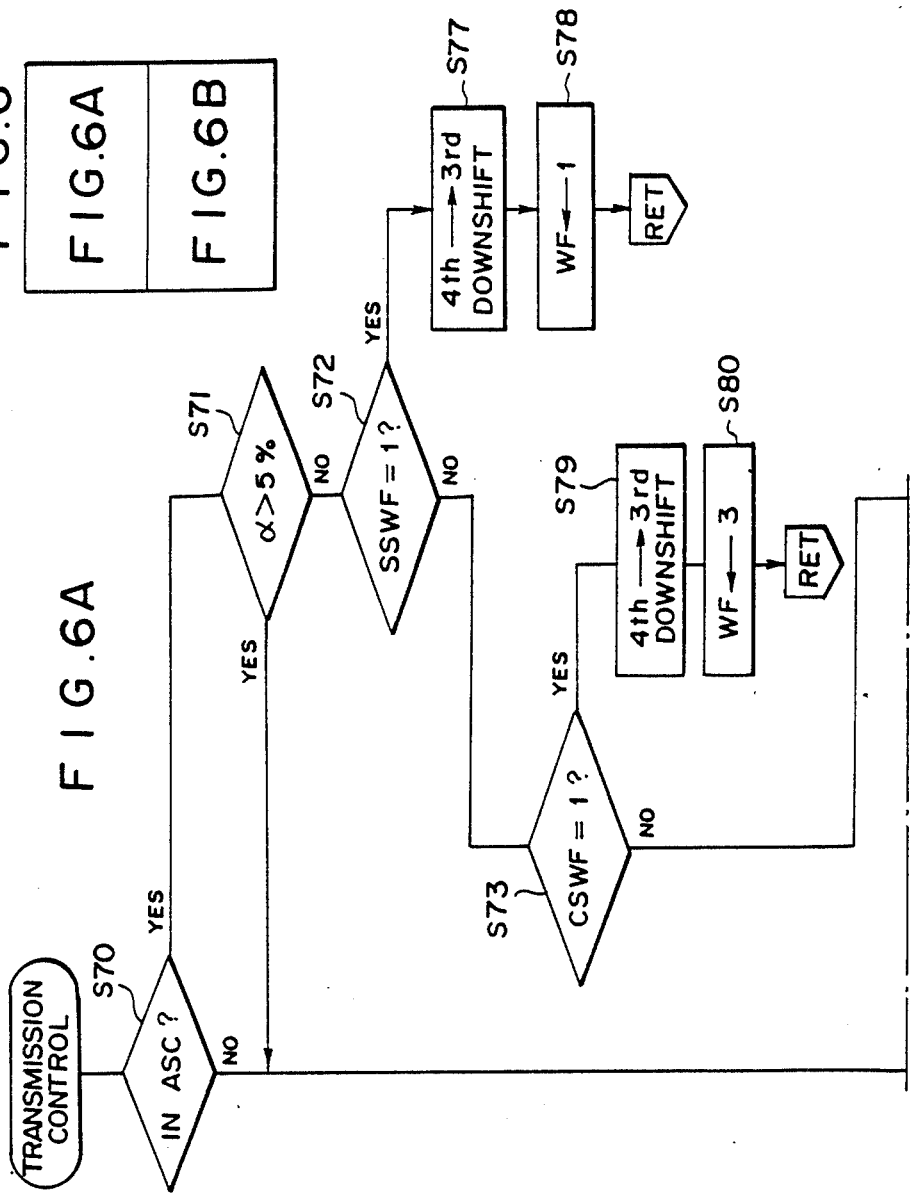

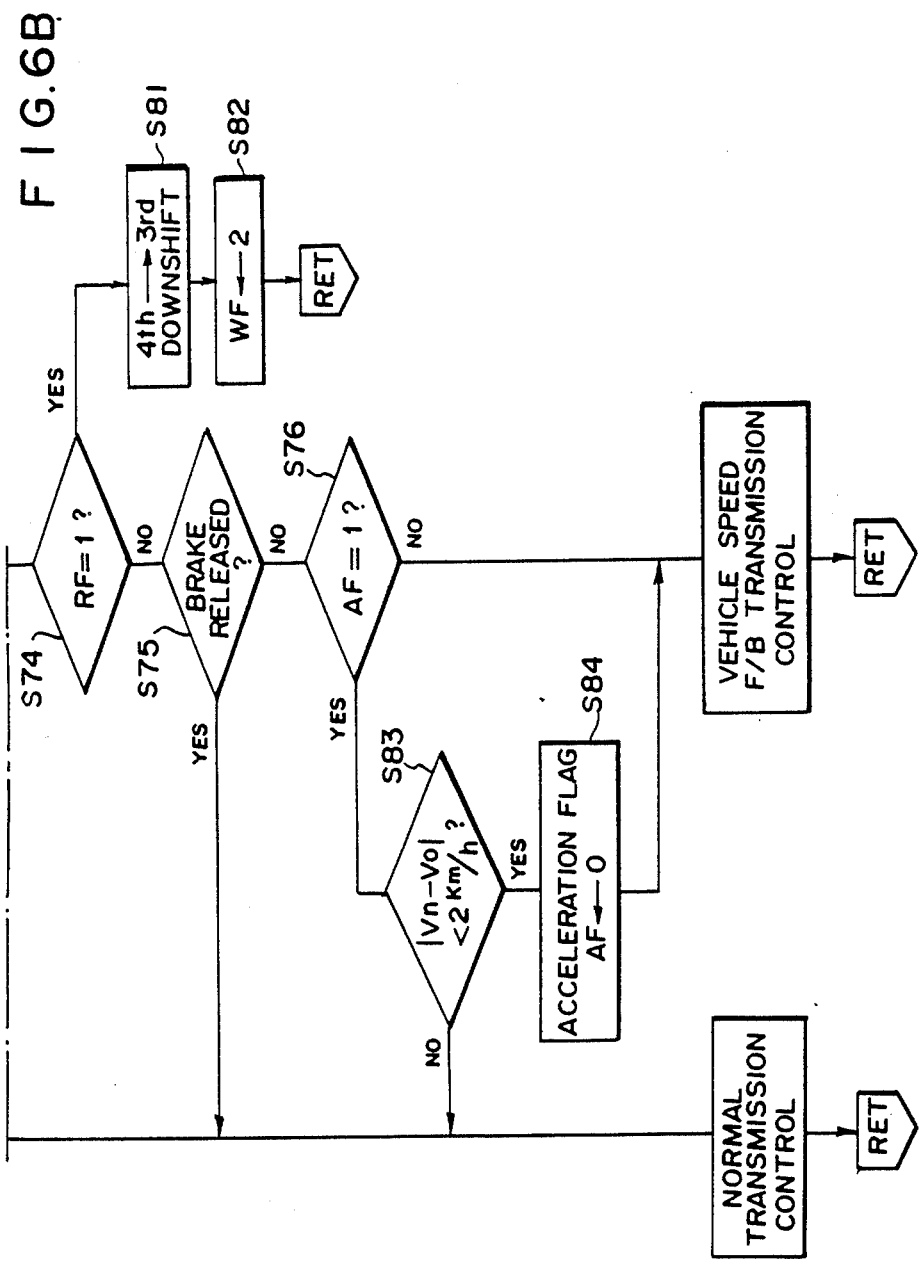

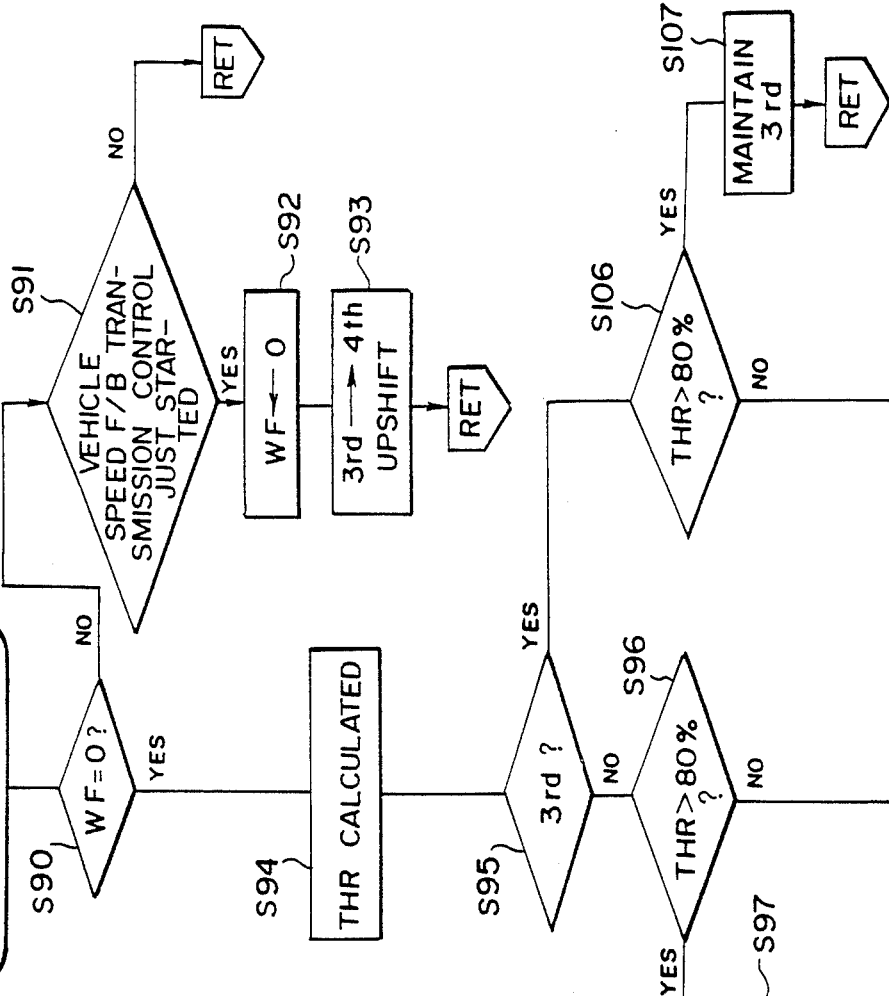

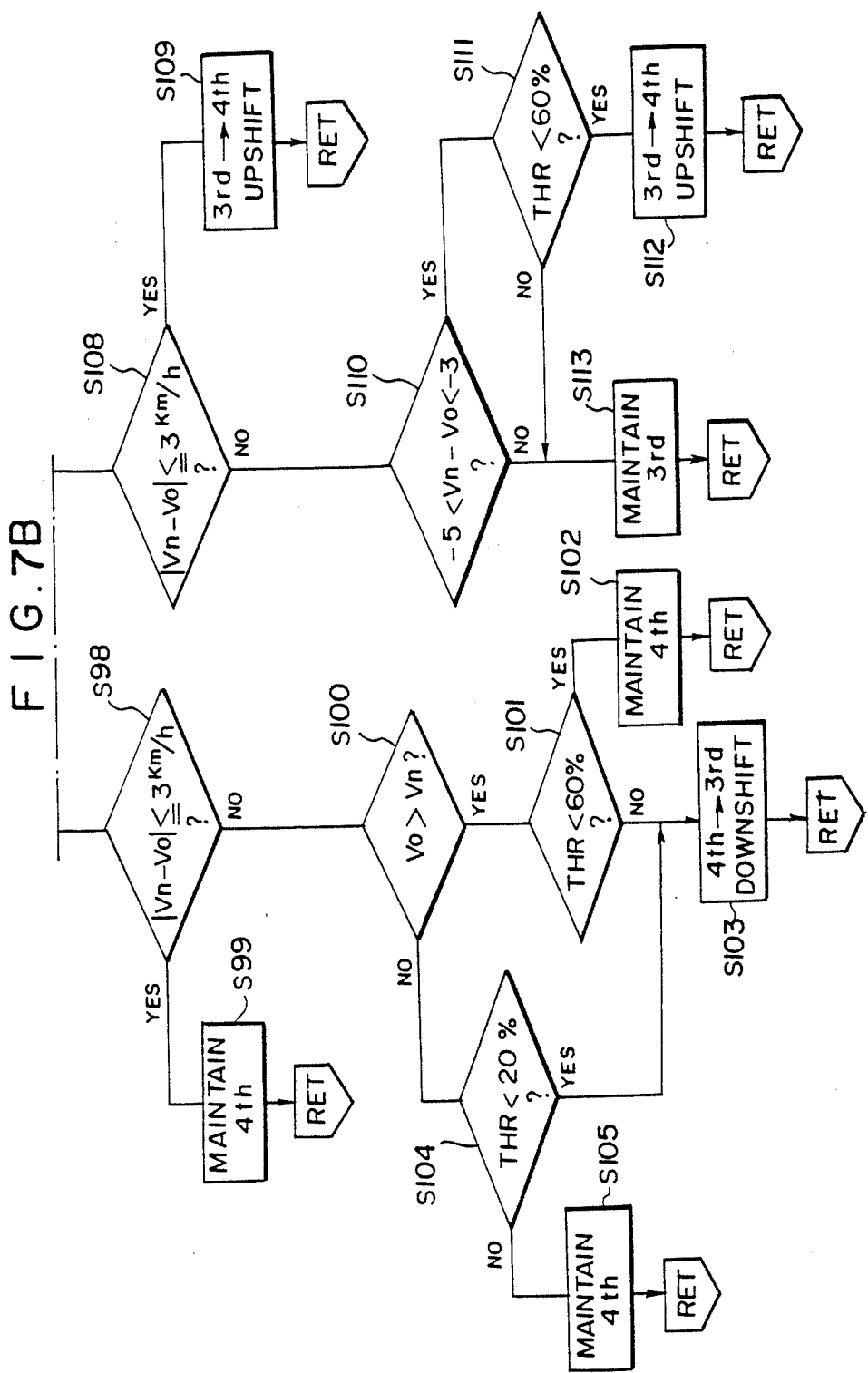

4,939,657

CONSTANT-SPEED CRUISING CONTROL SYSTEM

BACKGROUND OF THE INVENTION

1. Field of the Invention

This invention relates to a constant-speed cruising control system for a vehicle, which makes the vehicle cruise at a desired constant speed.

2. Description of the Prior Art

Constant-speed cruising control systems for making vehicles cruise at a desired constant speed are known in the art. For example, in the system disclosed in Japanese Unexamined Patent Publication No. 58(1983)-39312, the vehicle is made to cruise at a desired constant speed by feedback control of the throttle opening according to the difference between the actual vehicle speed and the target vehicle speed (the desired speed). That is, once a target vehicle speed is set, the engine output is controlled on the basis of a feedback signal representing the difference between the actual vehicle speed and the target vehicle speed to match the actual vehicle speed with the target speed without operation of the accelerator pedal.

Some of such constant-speed cruising control systems are provided with a function for accelerating the vehicle by controlling the throttle opening without operation of the accelerator pedal when the target vehicle speed is increased and when the vehicle is to be accelerated to the preceding target speed when the constant-speed cruising control is resumed after interruption. That is, when the target vehicle speed, which the vehicle speed is to match, is to be increased, a setting switch is operated and the vehicle is accelerated until the setting switch is released. The point at which the setting switch is released indicates the target vehicle speed, and feedback control of the vehicle speed is started when the setting switch is released. On the other hand, when a resume switch is operated after the constant-speed cruising control has been interrupted by operation of the brake, the vehicle is accelerated to the previously set target vehicle speed. However, when the vehicle is accelerated by controlling the throttle opening without the driver's operating the accelerator pedal, a problem arises because the acceleration of the vehicle changes according to the conditions under which the vehicle runs, i.e. the running condition, and can therefore deviate from the desired acceleration.

More particularly, the acceleration of the vehicle for a given throttle opening changes with the load on the engine, which load depends on the condition of the road surface, e.g., an ascent or a descent. The acceleration of the vehicle also changes with a driving torque which depends on, for instance, the gear stage of the transmission. Accordingly, the vehicle speed control performance may deteriorate.

Although it has been proposed to take into account the running condition of the vehicle during feedback control of the vehicle speed on the basis of the difference between the actual vehicle speed and the target vehicle speed (See, for example, U.S. patent Application Ser. No. 032,236.), the aforesaid problem, i.e. that the acceleration of the vehicle fluctuates according to the running condition of the vehicle, has not been solved.

SUMMARY OF THE INVENTION

In view of the foregoing observations and description, the primary object of the present invention is to provide a constant-speed cruising control system for a vehicle which is adapted to solve the aforesaid problem, which problem is inherent to conventional systems.

The constant-speed cruising control system in accordance with the present invention comprises an acceleration control means, which constantly detects the vehicle speed, when the vehicle speed is increased by a driver's command, and controls the throttle valve so that the throttle opening converges to a target throttle opening which is predetermined according to the vehicle speed, and a constant acceleration correcting means which outputs to the acceleration control means a running condition signal representing the running condition of the vehicle to correct the target throttle opening so that the vehicle speed is increased at a constant acceleration irrespective of the running condition of the vehicle.

BRIEF DESCRIPTION OF THE DRAWINGS

FIGS. 3 to 7 are flow charts respectively showing subroutines of the controller.

DESCRIPTION OF THE PREFERRED EMBODIMENTS

Figure 1:
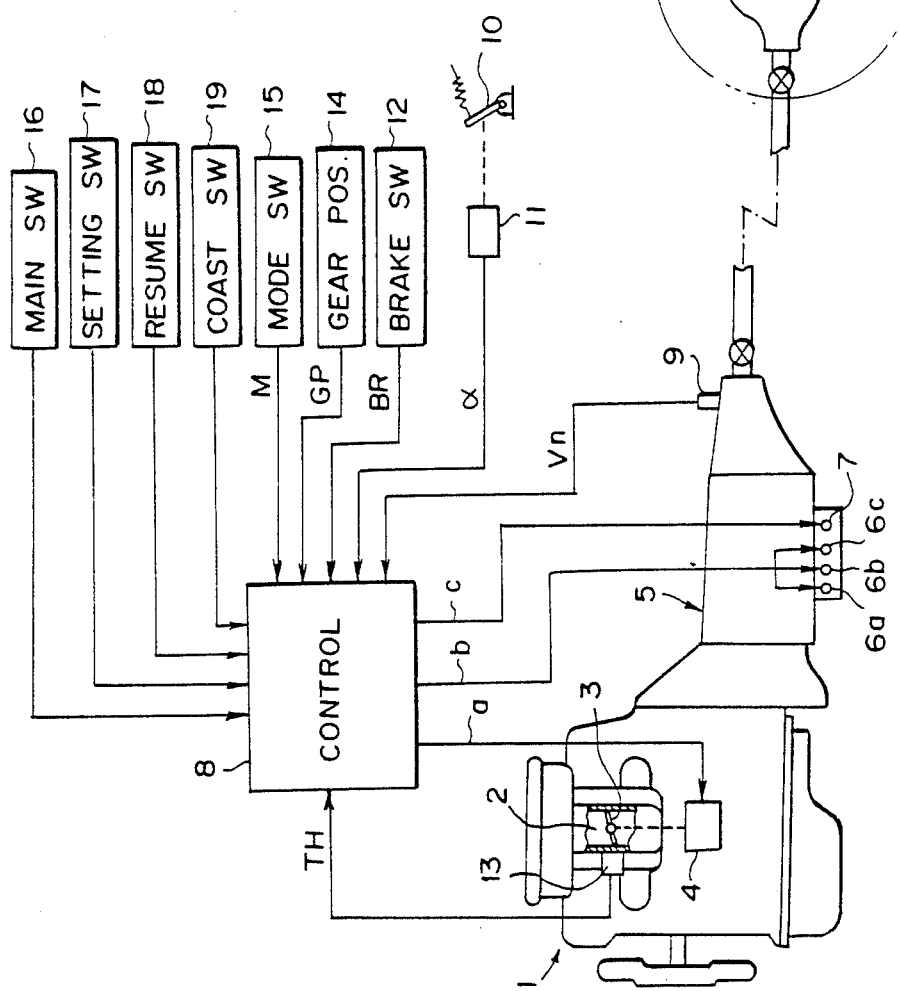
FIG. 1 is a schematic view showing a constant speed cruising system in accordance with an embodiment of the present invention.

In FIG. 1, an engine 1 has an intake passage 2 provided with a throttle valve 3 for controlling the amount of intake air. The throttle valve 3 is opened and closed by a throttle actuator 4 which may comprise a DC motor, for example. An automatic transmission 5 has gear-shifting solenoids 6a to 6c and a lockup solenoid 7, and by selectively energizing the gear-shifting solenoids 6a to 6c, the hydraulic control circuit of the automatic transmission 5 is controlled to selectively apply and release the hydraulic fastening elements of the automatic transmission 5, and the transmission gear mechanism is thereby caused to shift between the gear stages. By energizing the lockup solenoid 7, the lockup clutch (not shown) in the torque converter of the automatic transmission 5 is applied and by de-energizing the same, the lockup clutch is released.

A controller 8 outputs a throttle control signal a, a gear-shifting control signal b and a lockup control signal c, respectively, to the throttle actuator 4, the gear-shifting solenoids 6a to 6c, and the lockup solenoids 7. To the controller 8 are input a vehicle speed signal Vn from a vehicle speed sensor 9, an accelerator pedal depression signal α from an accelerator position sensor 11 which detects the amount of depression of an accelerator pedal 10, a brake signal BR from a brake switch 12 which detects application of a brake (not shown), a throttle opening signal TH from a throttle position sensor 13 which detects the opening of the throttle valve 3, a gear position signal GP from a gear position sensor 14 which detects which driving range the selector lever of the automatic transmission 5 is in, and a gear-shifting mode signal M from a mode switch 15. Further control signals (on-off signals) are input into the controller 8 from a main switch 16, a setting switch 17, a resume switch 18, and a coast switch 19, which act as control switches for constant-speed cruising control.

Operation of the controller 8 will be described with reference to the flow chart shown in FIG. 2.

Figure 2:
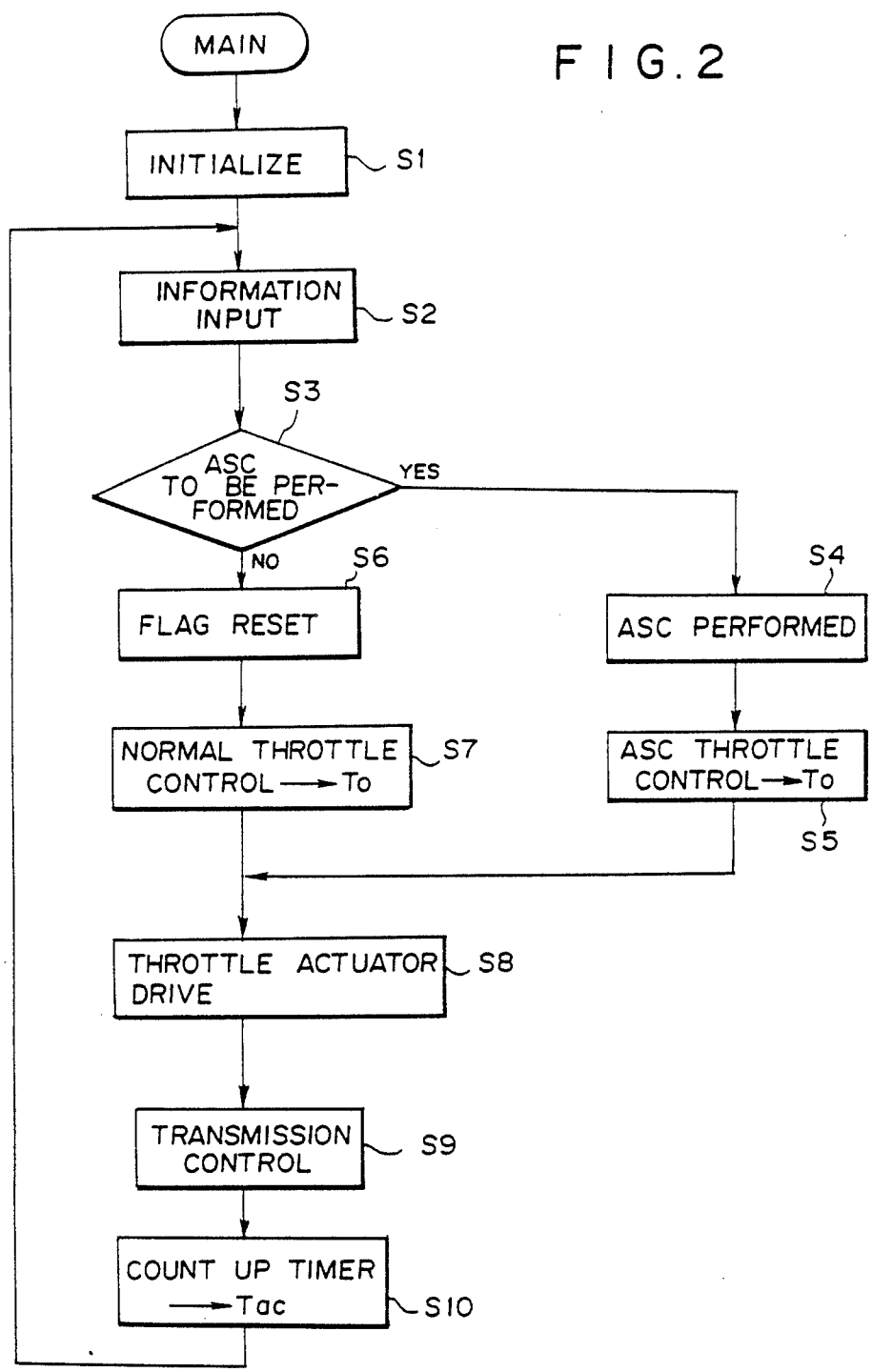
FIG. 2 is a flow chart showing a main routine of the controller.

FIG. 2 shows a main routine of the controller 8. The controller 8 is first initialized in step S1. Then in step S2, detecting signals from the aforesaid sensors are read and various information required for control is obtained. In step S3, whether the requirements for starting automatic speed control (ASC), including constant-speed cruising control, have been satisfied is determined. That is, when the main switch 16 has been closed, the selector lever is in D-range, and the vehicle speed is higher than a preset value (e.g., 40Km/h), the controller 8 determines that the ASC may be started. When one of these requirements is not satisfied, or the brake is operated, the ASC is interrupted.

When the ASC requirements have been satisfied, the controller 8 performs mode setting control, that is, the controller 8 selects a vehicle speed feedback control mode, an accelerating mode or the like, according to the operation of the setting switching 17, the resume switch 18, and the coast switch 19 as well as the operation of the accelerator pedal 10 and the brake (step S4). Then the controller 8 sets a target throttle opening To on the basis of the mode selected (step S5). On the other hand, when the ASC requirements have not been satisfied, the controller 8 proceeds from step S3 to step S6, where various flags for the ASC are reset. Then in step S7 the controller 8 sets a target throttle opening To according to the amount of depression of the accelerator pedal 10 (normal throttle control).

The controller 8 outputs a throttle control signal a corresponding to the target throttle opening To, set in step S5 or S7, to the throttle actuator 4, thereby moving the throttle valve 3 to the position corresponding to the target throttle opening To (step S8). Then in step S9, the controller 8 sets the gear stage on the basis of the vehicle speed signal Vn, the accelerator pedal depression signal α the throttle opening signal TH and the like and outputs the control signals b and c to the solenoids 6a to 6c and 7. Then in step S10, the controller 8 counts using an acceleration timer Tac, which causes a delay (to be described later). The routine shown in FIG. 2 is performed every predetermined time (e.g., 30 msec).

FIG. 3 shows a subroutine for the mode setting control carried out in step S4 of the main routine. In step S11 of this subroutine, the controller 8 determines whether the setting switch 17 has been closed. When the answer is YES, i.e., when it is judged that the setting switch 17 has been closed, a starting flag SF is set to 1 in step S12. In step S13 the controller determines whether the conditions require reset of the acceleration timer Tac, i.e., whether a target vehicle speed Vo has been set. In the case that the target vehicle speed Vo is to be set by the latest operation of the setting switch 17, for instance, which is the case when the ASC has been interrupted by application of the brake immediately after operation of the main switch 16, the acceleration timer Tac is reset to 0 in step S14. Since the brake release condition has been interrupted, a brake release flag BF is reset in step S15, and the target vehicle speed Vo is updated on the basis of the actual vehicle speed Vn in step S16. The latest target vehicle speed at the time the setting switch 17 is opened is adopted as the target vehicle speed Vo.

When the target vehicle speed Vo is set in the aforesaid manner and when that the ASC is now proceeding is determined through a judgement as to whether the starting flag SF is in the 1 position in step S17, the controller 8 then determines whether the brake pedal has been operated (step S18). When the answer is YES, the controller 8 shifts to the normal throttle control mode after setting the brake release flag BF to 1 (step S19). When the answer to the question of step S18 is NO, the controller determines whether the accelerator pedal 10 has been depressed (step S20), and if the answer is NO, the controller proceeds to step S21 where it determines whether the setting switch 17 has been closed. When it is judged in step S20 that the accelerator pedal has been depressed and at the same time it is judged that the brake release flag BF is in the 1 position (step S30), the controller 8 shifts to the normal throttle control mode. When it is judged in step S30 that the brake release flag BF is not in the 1 position, the controller 8 sets an acceleration flag AF to 1, and shifts to an accelerator acceleration control mode after substituting a throttle-opening-during-cruising Tcon (to be described later) for a target throttle opening Tv (also to be described later) in order to prepare the ASC for restarting.

When it is judged in step S21 that the setting switch 17 has been closed, the controller 8 performs setting control which will be described later with reference to FIG. 4. When it is judged in step S21 that the setting switch 17 is open, the controller 8 sets the setting switch flag SSWF to 0 in step S22. Thereafter, it is judged in step S23 whether the coast switch 19 has been closed. When the answer is YES, the target throttle opening To is set to 0 in step S33, and the throttle valve 2 is held in the full closed position so long as the coast switch 19 is closed. Then in step S34 a coast switch flag CSWF is set to 1. On the other hand, when it is judged in step S23 that the coast switch 19 is open, the controller 8 judges in step S24 whether the coast switch flag CSWF is in the 1 position. When the answer is NO, the controller 8 directly proceeds to step S27, while when the answer is YES, the controller 8 proceeds to step S27 by way of steps S25 and S26. In step S25, the actual vehicle speed Vn is adopted as the target vehicle speed Vo, and in step S26, the coast switch flag CSWF is reset to 0. In step S27, the controller 8 judges whether the resume switch 18 has been closed, and when the answer is YES, the controller 8 shifts to a resume control mode after setting the resume flag RF to 1 in step S35. On the other hand, when it is judged in step S27 that the resume switch 18 is open, the controller 8 shifts to a vehicle speed feedback control (constant-speed cruising control) mode provided that neither the resume flag nor the brake release flag BF is in the 1 position (steps S28 and S29).

In the vehicle speed feedback control mode, a throttle opening Tv, required for obtaining a target vehicle speed Vo, is calculated on the basis of the difference between the target vehicle speed Vo and the actual vehicle speed Vn, and the vehicle speed is feedback-controlled with the throttle opening thus calculated being used as a target throttle opening To. When the brake is operated during the vehicle speed feedback control, the answer in step S18 becomes YES, and accordingly the controller 8 interrupts the vehicle speed feedback control and shifts to the normal throttle control mode after setting the brake release flag BF to 1 in step S19.

In the normal throttle control mode, the amount of depression $\alpha$ of the accelerator pedal 10 is detected, and a basic throttle opening Tb for the detected amount of depression $\alpha$ is calculated taking into account the gear speed and the selected gear-shifting mode (i.e., economy, normal or power). Then the target throttle opening To is set by correcting the basic throttle opening Tb according to the speed with which the accelerator pedal is depressed, the vehicle speed, the engine coolant temperature, and the like.

Figure 9:
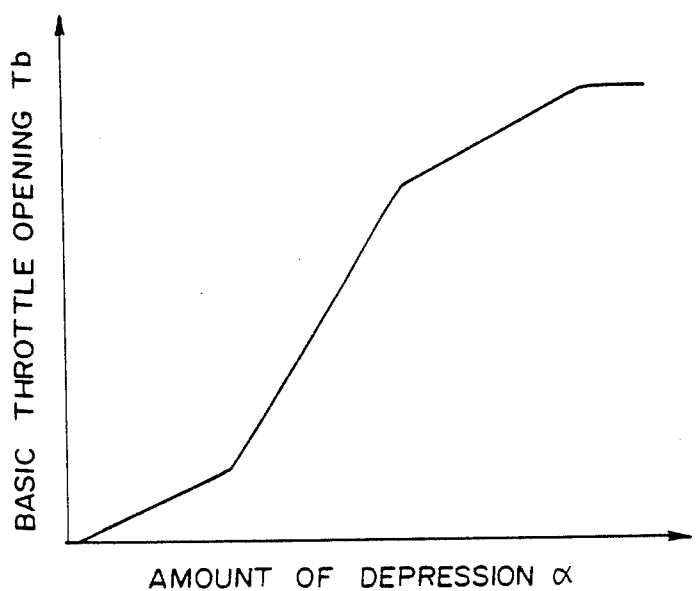
FIG. 9 shows an example of the relation between the basic throttle opening and the amount of depression of the accelerator pedal.

In the accelerator acceleration control, the target throttle opening To is set on the basis of the sum of the target throttle opening Tv, which corresponds to the target vehicle speed Vo in the vehicle speed feedback control which was performed by the controller 8 immediately before starting the accelerator acceleration control, and the basic throttle opening Tb, which corresponds to the amount of depression $\alpha$ of the accelerator pedal 10 at that time. FIG. 9 shows an example of the relation between the basic throttle opening Tb and the amount of depression of the accelerator pedal 10.

FIG. 4 shows the setting control subroutine indicated in FIG. 3. When the setting switch 17 is operated during vehicle speed feedback control, the controller 8 determines whether the count in the acceleration timer Tac has exceeded a preset value Tset (delay time) (step S40). When the answer is NO, the controller 8 shifts to the vehicle speed feedback control mode after resetting the setting switch flag SSWF in step S41. When it is judged that the count in the acceleration timer Tac has exceeded the preset value Tset, the controller 8 sets the setting switch flag SSWF to 1 in step S42, and reads the actual vehicle speed Vn in step S43. Then the controller 8 determines in step S44 whether a correction flag UF is in the 1 position, and when the answer is YES, the controller 8 directly proceeds to step S45, while when the answer is NO, the controller 8 proceeds to step S45 by way of steps S46 to S52. In step S46, the controller 8 reads the present target throttle opening Tv. Then the controller 8 obtains, on the basis of the actual vehicle speed Vn, a throttle opening Tcon for cruising on an even road from a map in which the throttle opening Tcon is related to the actual vehicle speed Vn (steps S47 and S48). Then a load compensating throttle opening Tdis is obtained on the basis of the difference between the present target throttle opening Tv and the even road cruising throttle opening Tcon for the actual vehicle speed Vn. In the next step S50, the controller 8 substitutes the even road cruising throttle opening Tcon for the present target throttle opening Tv. Further, the controller 8 sets the correction flag UF to 1 in step S51, and reads the load compensating throttle opening Tdis in step 52. Then the controller 8 proceeds to step S45.

In step S45, the controller 8 determines whether the selected gear-shifting mode is the power mode. When the answer is YES, the controller 8 obtains, on the basis of the actual vehicle speed Vn, a throttle opening Tres for accelerating the vehicle speed at a constant acceleration on an even road from a power mode constant acceleration map, in which the throttle opening Tres for the power mode is related to the actual vehicle speed Vn. When the answer is NO, the controller 8 obtains Tres from an economy mode constant acceleration map in which the throttle opening Tres for the economy mode is related to the actual vehicle speed Vn (steps S53-S55 or steps S54-S55). Then the controller 8 sets the target throttle opening To to the sum of Tres and Tdis in step S56.

Figure 10:
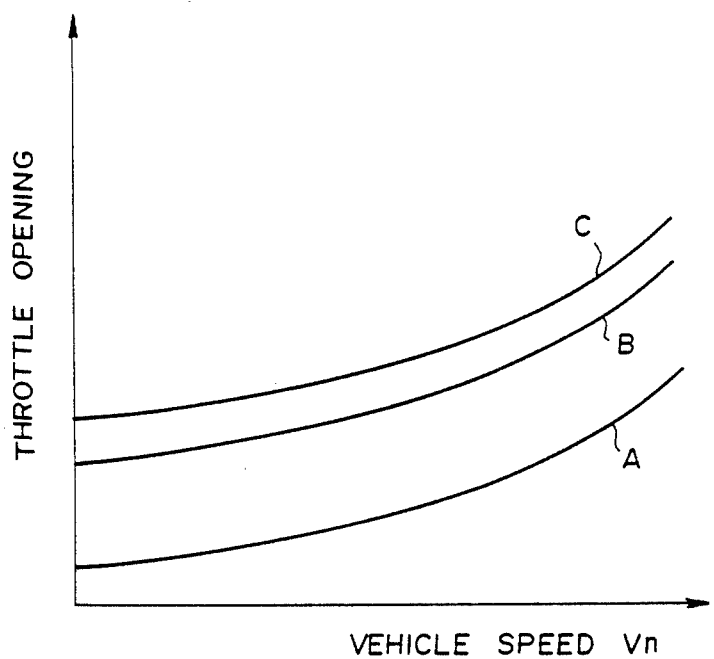
FIG. 10 shows a few examples of the relation between the vehicle speed and the throttle opening required for accelerating the vehicle at a predetermined constant acceleration during cruising on an even road.

In FIG. 10, curve A shows an example of the relation between the vehicle speed and the throttle opening required for the vehicle to cruise at a given constant speed on an even road. Curve B shows an example of the relation between the vehicle speed and the throttle opening required for accelerating the vehicle at a first predetermined constant acceleration during cruising on an even road, and curve C shows an example of the relation between the vehicle speed and the throttle opening required for accelerating the vehicle at a second predetermined constant acceleration during cruising on an even road. The second predetermined constant acceleration is higher than the first predetermined constant acceleration, that is, curve C is for the power mode and curve B is for the economy mode. Curves A, B and C are empirically obtained.

Figure 5:
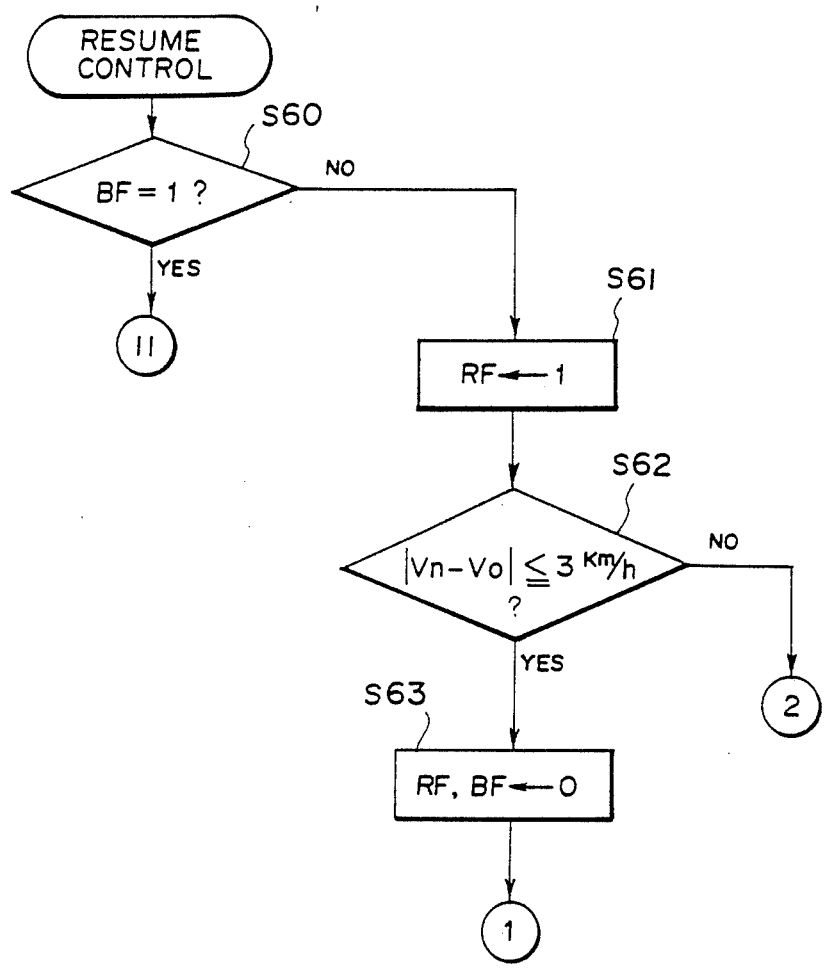

FIG. 5 shows the resume control subroutine indicated in FIG. 3. When the resume switch 18 is closed to return the target vehicle speed Vo to the original value set when the ASC was interrupted by operation of the brake during the vehicle speed feedback control, the controller 8 performs the resume control. The controller 8 first determines whether the brake release flag BF is in the 1 position (step S60), and when the answer is YES, the controller 8 shifts to the normal throttle control (FIG. 3). On the other hand, when the answer is NO, the controller 8 sets the resume flag RF to 1 in step S61, and determines in step S62 whether the difference between the target vehicle speed Vo and the actual vehicle speed Vn is within plus or minus 3Km/h, that is, whether the actual vehicle speed Vn is converging on the target vehicle speed Vo. When it is judged that the actual vehicle speed Vn is converging on the target vehicle speed, the controller 8 resets the resume flag RF and the brake release flag BF to 0 in step S63 and shifts to the vehicle speed feedback control. Otherwise, the controller 8 proceeds to step S43 in the setting control shown in FIG. 4.

FIG. 6 shows a subroutine for the transmission control carried out in step S9 of the main routine. In step S70 the controller 8 determines whether the ASC is now on. When the answer is NO, the controller 8 performs normal transmission control. In the normal transmission control, gear-shifting is controlled in accordance with a pattern in which the gear stage is related to the vehicle speed and the amount of depression $\alpha$ of the accelerator pedal 10. On the other hand, when the answer is YES, in steps S71 to S76 the controller 8 determines whether the accelerator pedal 10 has been depressed, whether the setting switch flag SSWF is in the 1 position, whether the coast switch flag SWF is in the 1 position, whether the resume flag RF is in the 1 position, whether the brake has been released, and whether the acceleration flag AF is in the 1 position. When the answers in steps S71 to S76 are all NO, the controller 8 performs vehicle speed feedback transmission control.

When it is judged in step S71 that the accelerator pedal 10 has been depressed, the controller performs normal transmission control. When it is judged in step S72 that the setting switch flag SSWF is in the 1 position, the controller 8 shifts the transmission down from fourth gear to third gear in step S77, and sets a switch flag WF to 1 in step S78. When it is judged in step S73 that the coast switch flag CSWF is in the 1 position, the controller 8 shifts the transmission down from fourth gear to third gear in step S79 and sets the switch flag WF to 3 in step S80. When it is judged in step S74 that the resume flag RF is in the 1 position, the controller 8 shifts the transmission down from fourth gear to third gear in step S81 and sets the switch flag WF to 2 in step S82. Further, when it is judged in the step S75 that the brake has been released, the controller performs normal transmission control. When it is judged in step S76 that the acceleration flag AF is in the 1 position, and at the same time it is judged in step S83 that the difference between the target vehicle speed Vo and the actual vehicle speed Vn is not larger than a predetermined value, e.g., 2 Km/h, the controller 8 performs vehicle speed F/B transmission control after resetting the acceleration flag AF to 0 in step S84.

FIG. 7 shows a subroutine for the vehicle speed feedback transmission control. First the controller 8 determines in step S90 whether the switch flag WF has been reset. The switch flag WF is set in steps S78, S80 or S82, which are shown in FIG. 6. When the switch flag WF has not been reset, the controller 8 proceeds to step S91 and determines whether the vehicle speed feedback transmission control has just been started. When the answer is YES, the switch flag WF is reset in step S92 and the transmission, which was shifted down to third gear in step S77, S79 or S81 is shifted up to fourth gear in step S93.

When it is judged in step S90 that the switch flag WF has been reset, an average throttle opening THR is calculated in step S94. The average throttle opening THR is the average of a predetermined number of preceding detected throttle openings THn. In the vehicle speed feedback transmission control the average throttle opening THR is used in order to prevent hunting of the transmission when the throttle opening per se is hunting. Thereafter, the controller 8 determines in step S95 whether the transmission is in third gear on the basis of the gear position signal GP. When the answer is NO, the controller 8 proceeds to step S96 and determines whether there is a sufficient torque margin by judging whether the throttle opening THR has exceeded 80%. When the throttle opening THR has exceeded 80% and the torque margin is insufficient, the controller 8 shifts the transmission down to third gear in step S97. Otherwise, the controller 8 determines in step S98 whether the difference between the target vehicle speed Vo and the actual vehicle speed Vn is within plus or minus 3Km/h, that is, whether the actual vehicle speed Vn is converging on the target vehicle speed Vo. When it is judged that the actual vehicle speed Vn is converging on the target vehicle speed Vo, the controller 8 holds the transmission in fourth gear (step S99). Otherwise, the controller 8 determines in step S100 whether the actual vehicle speed Vn is lower than the target vehicle speed Vo. When the former is lower than the latter, which is the case, for instance, when the vehicle is ascending a slope, the controller 8 determines in step S101 whether there is a sufficient torque margin by judging whether the throttle opening THR is less than 60%. When the throttle opening is less than 60%, that is, when there is a sufficient torque margin, the controller 8 holds the transmission in fourth gear, considering that the transmission need not be shifted down to accelerate the vehicle (step S102). On the other hand, when the throttle opening is more than 60%, the controller 8 considers the torque margin insufficient to accelerate the vehicle and shifts the transmission down to third gear (step S103).

On the other hand, when it is judged in step S100 that the actual vehicle speed Vn is not lower than the target vehicle speed Vo, which is the case, for instance, when the vehicle is descending a slope, the controller 8 proceeds to step S104 and determines whether the throttle opening THR is less than 20%, thereby judging whether the engine brake effect is sufficient. When it is judged that the throttle opening THR is more than 20% and the engine brake effect can be further enhanced to a sufficient extent, the controller 8 holds the transmission in fourth gear, considering that the transmission need not be shifted down to decelerate the vehicle (step S105). On the other hand, when the throttle opening THR is less than 20% and it is considered that the engine brake effect is not sufficient to decelerate the vehicle, the controller 8 shifts the transmission down to third gear (step S103).

When it is judged in step S95 that the transmission is in third gear, the controller 8 proceeds to step S106 and determines whether there is a sufficient torque margin by judging whether the throttle opening THR has exceeded 80%. When the throttle opening THR has exceeded 80% and the torque margin is insufficient, the controller 8 holds the transmission in third gear (step S107). Otherwise, the controller 8 determines in step S108 whether the difference between the target vehicle speed Vo and the actual vehicle speed Vn is within plus or minus 3Km/h, that is, whether the actual vehicle speed Vn is converging on the target vehicle speed Vo. When it is judged that the actual vehicle speed Vn is converging on the target vehicle speed Vo, the controller 8 shifts the transmission up to fourth gear in step S109. Otherwise, the controller 8 determines in step S110 whether the actual vehicle speed Vn is 3 to 5Km/h lower than the target vehicle speed Vo. When the former is lower than the latter and the difference therebetween is 3 to 5Km/h, which is the case, for instance, when the vehicle is ascending a slope, the controller 8 determines in step S111 whether there is a sufficient torque margin by judging whether the throttle opening THR is less than 60%. When the throttle opening is less than 60%, that is, when there is a sufficient torque margin, the controller 8 shifts the transmission up to fourth gear, considering that fourth gear will suffice for accelerating the vehicle (step S112). On the other hand, when the throttle opening is more than 60%, the controller 8 considers the torque margin insufficient to accelerate the vehicle and holds the transmission in third gear (step S113).

Figure 11:
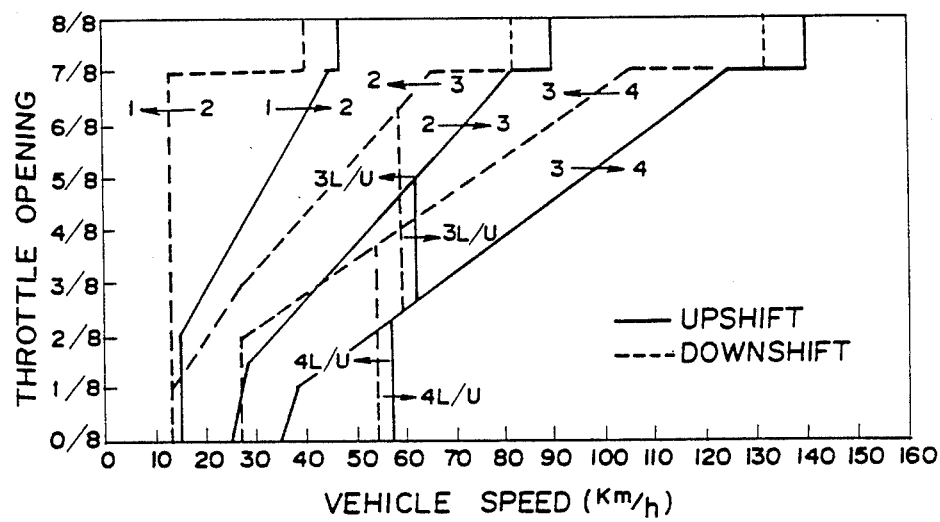
FIG. 11 shows an example of the relationships between the throttle opening and the vehicle speed when shifting between various gears when the vehicle operates in the economy mode.
Figure 12:
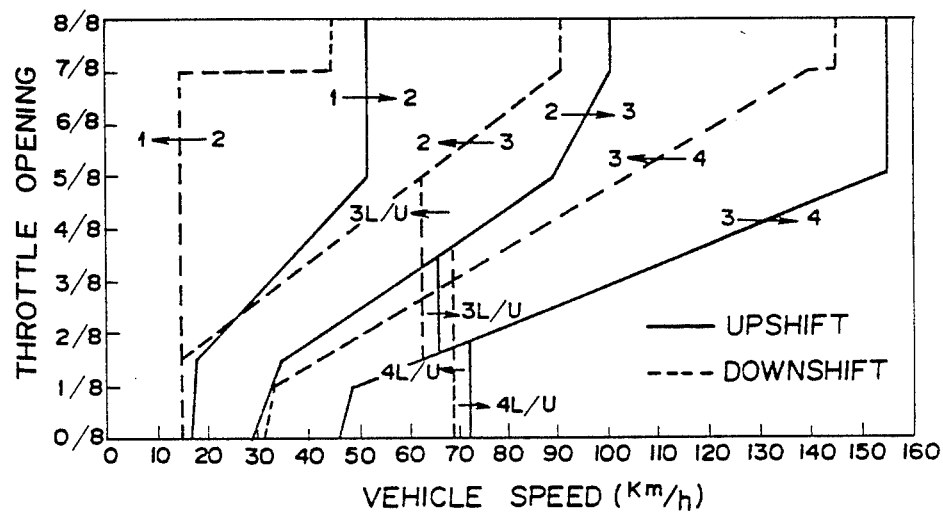
FIG. 12 shows an example of the relationships between the throttle opening and the vehicle speed when shifting between various gears when the vehicle operates in the power mode.

The particular values of the throttle opening for judging the torque margin, i.e., 80%, 60%, 20%, may be suitably determined depending on the output characteristics of the engine or the like. FIG. 11 shows an example of the relationships between the throttle opening and the vehicle speed when shifting between various gears when the vehicle operates in the economy mode, and FIG. 12 shows an example of the relationships between the throttle opening and the vehicle speed when shifting between various gears when the vehicle operates in the power mode.

Figure 8:
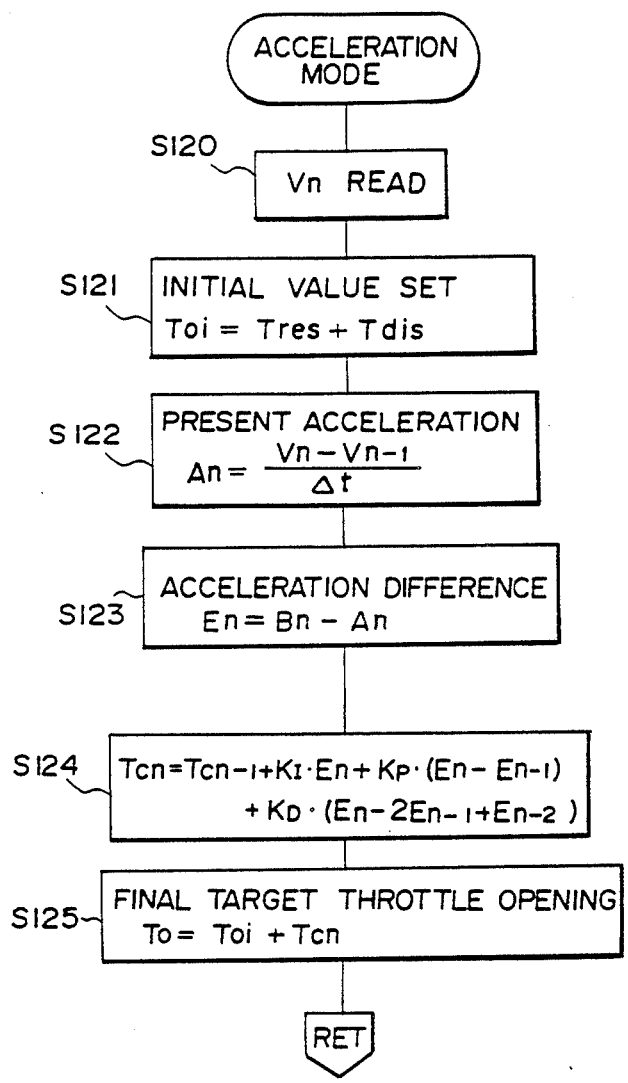
FIG. 8 is a flow chart showing a modification of the acceleration control chart shown in FIG. 7.

FIG. 8 shows a modification of steps S43 to S56 (acceleration mode) of FIG. 4. In this modification, in addition to the load compensation of the target throttle opening To at the beginning of the acceleration, the acceleration of the vehicle is detected through the change in the vehicle speed in the course of acceleration, and the throttle opening is controlled so that the detected acceleration converges on a target acceleration, thereby maintaining a desired constant acceleration even if the engine load fluctuates during acceleration.

First the controller 8 reads the actual vehicle speed Vn in step S120, and then in the next step S121, the controller 8 sets an initial value Toi of the target throttle opening To. The initial value Toi is set, in a manner similar to the process shown in FIG. 4, to the sum of a load compensating throttle opening Tdis, which is obtained on the basis of the difference between the present target throttle opening Tv and the even road cruising throttle opening Tcon for the actual vehicle speed Vn, and the throttle opening Tres for accelerating the vehicle speed at a constant acceleration on an even road obtained from an even road constant acceleration map. Thus the acceleration control is started.

Then the controller 8 calculates the present acceleration An from the difference between the present actual vehicle speed Vn and the preceding actual vehicle speed Vn-1 (step S122), and calculates the difference En between the present acceleration An and the target acceleration Bn (step S123). Further, the controller 8 calculates a correction amount Tcn for the throttle opening on the basis of the difference En (step S124) and sets a final target throttle opening To on the basis of the initial value Toi and the correction amount Tcn (step S125).

The target acceleration Bn is determined to be the highest when the vehicle operates in the power mode and to be the lowest when the vehicle operates in the economy mode. The correction amount Tcn is obtained by adding an integral control element, a proportional control element and a differential control element corresponding to the difference En with the preceding correction amount Tcn-1.

When the acceleration feedback described above is to be effected, an insensitive zone may be provided for the difference En between the detected acceleration and the target acceleration Bn so that when the absolute value of the difference En becomes so large as to exceed the insensitive zone, the initial value Toi of the target throttle opening is corrected by a correction coefficient Cn which is read from a table in which it is set to have a value smaller or larger than 1. That is, the final target throttle opening To=Toi×Cn. With this arrangement, the control system can be simplified.

Further, the throttle opening may be controlled so that the actual acceleration of the vehicle detected by an acceleration sensor coverges on the target acceleration.

We claim:

1. A constant-speed cruising control system for a vehicle comprising:
   a vehicle speed control means which uses feedback to control the throttle opening of the engine according to the difference between the actual vehicle speed and a target vehicle speed so that the actual vehicle speed matches the target vehicle speed;
   an acceleration control means, which when the vehicle speed is increased in response to a driver's command, constantly detects the vehicle speed, and controls the throttle valve so that the throttle opening converges on a target throttle opening, which target throttle opening is predetermined according to the target vehicle speed; and
   a constant acceleration correcting means which outputs to the acceleration control means a running condition signal representing the running condition of the vehicle to correct the target throttle opening so that the vehicle speed is increased at a constant acceleration irrespective of the running condition of the vehicle, said constant acceleration correcting means makes said correction on the basis of the difference between an even road cruising throttle opening, which corresponds to the actual vehicle speed detected upon initiation of an acceleration, and the target throttle opening set when the acceleration is initiated.

2. A constant-speed cruising control system as defined in claim 1 in which said constant acceleration correcting means makes said correction on the basis of the difference between an actual acceleration and a target acceleration in addition to the correction on the basis of the difference between the even road cruising throttle opening which corresponds to the actual vehicle speed detected upon initiation of an acceleration and the target throttle opening set when the acceleration is initiated.

3. A constant-speed cruising control system as defined in claim 1 in which said vehicle is provided with an automatic transmission having a plurality of operational modes, and the target throttle opening for a given target vehicle speed differs according to the operational mode of the automatic transmission.

4. A constant-speed cruising control system as defined in claim 3 in which said automatic transmission has a power mode and an economy mode, and the target throttle opening for a given vehicle speed is larger for the power mode than for the economy mode.

5. A constant-speed cruising control system as defined in claim 1 in which said driver's command is transmitted to the constant-speed cruising control system by an operation of the driver to increase the target vehicle speed.

6. A constant-speed cruising control system as defined in claim 5 in which said vehicle is provided with an automatic transmission and said acceleration control means shifts the automatic transmission down upon receipt of said driver's command.

7. A constant-speed cruising control system as defined in claim 1 in which said driver's command is transmitted to the constant-speed cruising control system by an operation of the driver to increase the vehicle speed to the target vehicle speed in the preceding constant-speed cruising control after interruption of the constant-speed cruising control.

8. A constant-speed cruising control system as defined in claim 7 in which said vehicle is provided with an automatic transmission and said acceleration control means shifts the automatic transmission down upon receipt of said driver's command.

9. A constant-speed cruising control system as defined in claim 7 in which said target throttle opening is feedback-controlled when the difference between the actual vehicle speed and said target vehicle speed in the preceding constant-speed cruising control becomes smaller than a preset value.

10. A constant-speed cruising control system for a vehicle comprising:
- a vehicle speed control means, which uses feedback to control the throttle opening of the engine according to the difference between the actual vehicle speed and a target vehicle speed so that the actual vehicle speed matches the target vehicle speed;
- an acceleration control means which, when the vehicle speed is increased in response to a driver's command, constantly detects the vehicle speed, and controls the throttle valve so that the throttle opening converges on a target throttle opening, which target throttle opening is predetermined according to the target vehicle speed; and
- a constant acceleration correcting means which corrects the target throttle opening on the basis of the difference between an acutal acceleration and a target acceleration so that the vehicle speed is increased at a constant acceleration irrespective of the running condition of the vehicle, said constant acceleration correcting means further makes said correction on the basis of the difference between an even road cruising throttle opening, which corresponds to the actual vehicle speed detected upon initiation of an acceleration, and the target throttle opening set when the acceleration is initiated.

11. A constant-speed cruising control method for a vehicle in which the throttle opening of the engine is feedback-controlled according to the difference between an actual vehicle speed and a target vehicle speed so that the actual speed matches the target vehicle speed comprising the steps of:
- constantly detecting the vehicle speed when said vehicle speed is increased by a driver's command, controlling the throttle valve so that the throttle opening converges on a target throttle opening which is predetermined according to the target vehicle speed, and correcting the target throttle opening according to the running condition of the vehicle so that the vehicle speed is increased at a constant acceleration irrespective of the running condition of the vehicle, wherein the target throttle opening is corrected on the basis of the difference between an even road cruising throttle opening, which corresponds to the actual vehicle speed detected upon initiation of an acceleration, and a target throttle opening detected when the acceleration is initiated.

12. A constant-speed cruising control method for a vehicle in which a throttle opening of an engine is feedback-controlled according to the difference between an actual vehicle speed and a target vehicle speed so that the actual vehicle speed matches the target vehicle speed comprising the steps of:
- constantly detecting the vehicle speed when the vehicle speed is increased by a driver's command, controlling a throttle valve so that the throttle opening converges on a target throttle opening which is predetermined according to the target vehicle speed, and correcting the target throttle opening on the basis of the difference between an actual acceleration and a target acceleration so that the vehicle speed is increased at a constant acceleration irrespective of the running condition of the vehicle, wherein the target throttle opening is corrected on the basis of the difference between an even road cruising throttle opening, which corresponds to the actual vehicle speed detected upon initiation of an acceleration, and a target throttle opening detected when the acceleration is initiated.

* * * * *